US006285955B1

(12) United States Patent
Goldwasser

(10) Patent No.: US 6,285,955 B1
(45) Date of Patent: Sep. 4, 2001

(54) DOWN HOLE AND ABOVE GROUND DATA LOGGERS

(75) Inventor: Jack M. Goldwasser, Grants Pass, OR (US)

(73) Assignee: Mountain Energy, Inc., Grants Pass, OR (US)

( * ) Notice: Subject to any disclaimer, the term of this patent is extended or adjusted under 35 U.S.C. 154(b) by 0 days.

(21) Appl. No.: 09/360,227

(22) Filed: Jul. 24, 1999

(51) Int. Cl.⁷ .................................................. G01V 1/28
(52) U.S. Cl. ............................................................ 702/6
(58) Field of Search .............................. 702/6, 7, 8, 187, 702/188, 127

(56) References Cited

U.S. PATENT DOCUMENTS

| | | | |
|---|---|---|---|
| 4,811,249 | * 3/1989 | Marsh .................................... | 702/187 |
| 4,831,558 | * 5/1989 | Shoup et al. .......................... | 702/188 |
| 4,894,728 | 1/1990 | Goodman ................................ | 360/6 |
| 4,910,692 | 3/1990 | Outram et al. ........................ | 364/550 |
| 5,068,850 | * 11/1991 | Moore .................................... | 370/449 |
| 5,249,863 | 10/1993 | Brown .................................... | 374/102 |
| 5,502,656 | 3/1996 | Fulcher et al. ........................ | 364/550 |
| 5,638,299 | * 6/1997 | Miller .................................... | 702/127 |
| 5,646,863 | * 7/1997 | Morton .................................. | 702/23 |
| 5,682,508 | * 10/1997 | Hocker, III ............................. | 709/234 |
| 5,689,248 | * 11/1997 | Esfahani et al. .................. | 340/853.1 |
| 5,784,004 | * 7/1998 | Esfahani et al. .................. | 340/854.6 |
| 6,088,514 | * 7/2000 | Foreman et al. ....................... | 709/213 |

* cited by examiner

Primary Examiner—Donald E. McElheny, Jr.
(74) Attorney, Agent, or Firm—Pillsbury Winthrop LLP

(57) ABSTRACT

The down hole and above ground data loggers according to the present invention can be used with any sensors or probes. The switching associated with different sensors is accomplished on a circuit board in the data logger using an external device. The data loggers can send data to the external device via hard wire or radio frequency. Sending the data via radio frequency eliminates the need for a user to go out to the field. Thus, the user can obtain real time and historical data without having to go out to the field. In one embodiment, a down hole data logger is disclosed that is capable of being installed or deployed in small openings. In another embodiment, an above ground data logger is disclosed. In both embodiments, the data loggers can record analog sensor data or discrete data. The data loggers of the present invention are easy to use, reliable, accurate, cost efficient, and feature rich.

45 Claims, 14 Drawing Sheets

Advanced Setup

Manufacturer Finder ▼    Manufacturer Name [Handar] ▼    Add Manufacturer

| Description | Model # | Measures | Units | Voltage | Sensor Type | Low Value | High Value | Scaling Factor |
|---|---|---|---|---|---|---|---|---|
| Rain Gauge Tipping Bucket | 444B | Precipitation | mm | | Discrete ▼ | | | 360 |
| Optical Rain Gauge | 444OPT | Precipitation | mm | | 0-5V ▼ | 0 | 100 | |
| Air Temperature | 432A/435A | Temperature | Deg F | 12.5 | 4-20mA ▼ | 0 | 120 | |
| Relative Humidity | 435A | Humidity | Percent | | 0-5V ▼ | 0 | 100 | |
| Relative Humidity | 447B | Humidity | Percent | | 4-20mA ▼ | 0 | 100 | |
| Visibility | 470A/B | Visibility | Feet | | 0-5V ▼ | 0 | 500 | |
| Submersible Pressure Transdu | 449A/B | Depth | Feet | | 4-20mA ▼ | 0 | 40 | |
| Wind Speed | 430A/B | Wind Speed | MPH | | Discrete ▼ | | | 0.001 |
| Wind Direction | 431A/B | Wind Direction | Degrees | | 0-5V ▼ | 0 | 360 | |

Delete Selected Sensor      Add Sensor for Current Manufacturer 1200, 1210, 1220, 1230, 1240

FIG. 14

DOWN HOLE AND ABOVE GROUND DATA LOGGERS

FIELD OF THE INVENTION

The present invention relates to data loggers that are implemented either down hole or above ground. More particularly, the present invention is directed to a data logger that can be used with any sensors or probes while the switching is implemented on a circuit board in the data logger using a computer.

BACKGROUND OF THE INVENTION

Recording data has been around for hundreds of years. People first recorded data manually using some type of measuring device, pencil, and paper. Thereafter, chart recorders were commonly used in lieu of the pencil and paper method for recording data. In recent times, however, data loggers are being used as substitutes for chart recorders.

A data logger is basically an electronic device that records measurements such as temperature, relative humidity, light intensity, wind direction, wind speed, visibility, precipitation, depth, current, voltage, pulse, events, etc. at regular time intervals. Other environmental parameters such as stream flow, water quality, topography, and terrestrial habitat can also be measured using the data logger. Data loggers are used in many remote areas or anywhere that a user would want the convenience of battery power to record measurements. For example, data loggers are ideal devices for those involved with field studies, transportation monitoring, HVAC tests, quality studies, troubleshooting, general research, and the like. Thus, it is easy to understand why data loggers are commonly used in a wide variety of applications.

The first data loggers were quite large, heavy, and required a great amount of power. Thus, they were very inconvenient and expensive to use. However, current data loggers come in various sizes, but typically, they are small to medium size, battery powered devices that include a microcontroller, data memory, and one or more sensors.

The data recorded by the data logger is generally stored in some type of data memory within the data logger. In many instances, a non-volatile memory is used to ensure that the data stored in the data logger is saved even after the battery is removed or the data logger is damaged.

Calibration adjustments to data loggers are generally required during each data collection cycle. When calibration adjustments are needed, implementing such calibrations require retrieval of the data logger.

For set-up, a conventional data logger is typically connected to a personal computer. Then, software running on the personal computer is activated to select logging parameters such as sampling intervals and start time in order to initiate the data logger. The data logger is then disconnected from the computer and placed in a desired location for recording data, which location is typically remote. The data logger records each measurement and stores it in its data memory along with the corresponding time and date. Thus, at this stage, the data logger is operated independently on its own battery until the user desires to retrieve the recorded data from the data logger.

When the user desires to retrieve the recorded data, the data logger is retrieved from the remote location, and then reconnected to the personal computer. The running software on the personal computer is used to read the data from the data logger. The data can then be used to create a table or a graph. The tabulated data can be further exported to a spreadsheet program or other programs for additional data manipulation or processing.

Although conventional data loggers are widely used, problems remain. For example, conventional data loggers are not easily adaptable to using different type of sensors or probes to measure different parameters. For instance, whenever a new sensor or probe is implemented with a conventional data logger, manual switching within the data logger is necessary. This process can be very time consuming and inconvenient for the user.

Another problem associated with many types of conventional data loggers is that the user must physically go out to the field to retrieve the recorded data from the data loggers. Again, this process can be very time-consuming, burdensome, and inconvenient for the user, particularly when the weather is bad (rain, snow, wind, etc.). Further, most data loggers are not designed such that they can be installed or deployed in small openings. Accordingly, there is a need for a data logger that provides more convenience and accuracy in recording data. Thus, the present invention overcomes these and other disadvantages of conventional data loggers.

SUMMARY OF THE INVENTION

It is an object of the present invention to provide a data logger that is easy to use, reliable, and accurate.

It is another object of the present invention to provide a data logger that is user friendly, cost efficient, and feature rich.

It is another object of the present invention to provide a data logger that can provide instant access to real time and historical data without the user being out in the field.

It is a further object of the present invention to provide a data logger that can provide instant access to real time and historical data without the user needing additional equipment or a computer.

It is another object of the present invention to provide a down hole data logger that is capable of being disposed in small openings.

It is a further object of the present invention to provide a data logger that can be used with any sensors or probes while the switching is implemented on a circuit board in the data logger using an external device.

It is yet another object of the present invention to provide a data logger that can send data to an external device via hard wire or radio frequency.

It is yet another object of the present invention to provide a data logger that can send data using unlicensed, low power radio frequency in the 900 to 928 MHz range.

In one embodiment of the present invention, a down hole data logger is disclosed that is capable of being installed or deployed in small openings. In another embodiment, an above ground data logger is disclosed. In both embodiments, the data loggers can record analog and discrete data and can send the recorded data to a base station using radio frequency signals, preferably in the unlicensed or free frequency range. An external device can be used to set up the data logger such that all the hardware switching is done via software commands. The present invention provides advantages over prior art data loggers by accurately and conveniently recording data.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which:

FIG. 14 illustrates an advanced set up window displayed on an external device for setting up a data logger in accordance with the present invention;

DETAILED DESCRIPTION OF THE PREFERRED EMBODIMENTS

Figure 1:
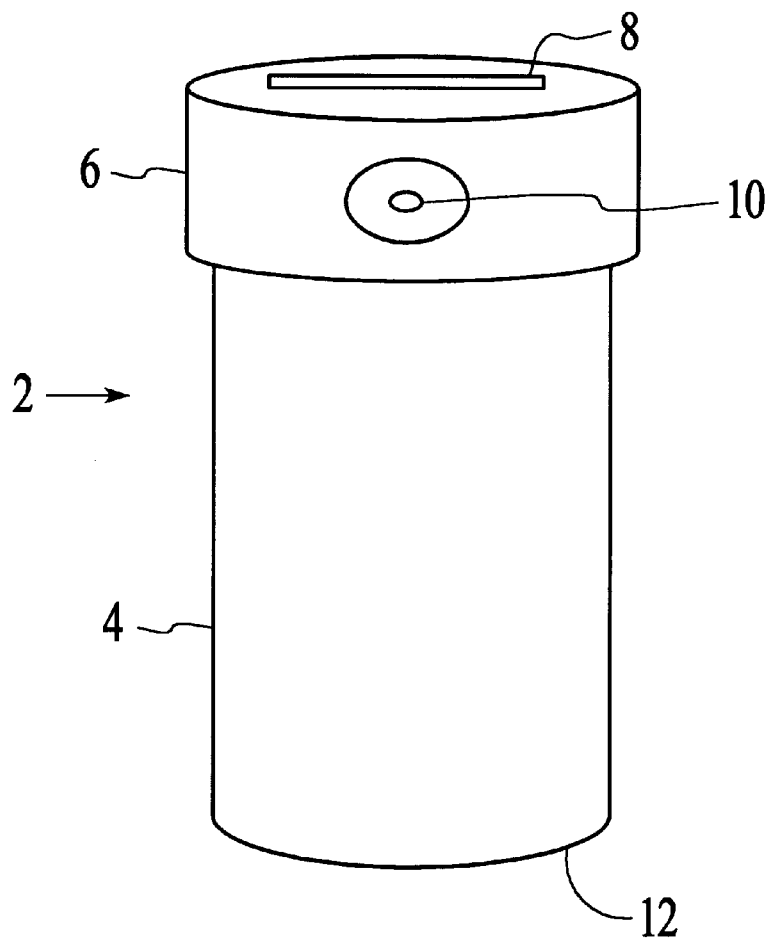
FIG. 1 illustrates a simplified diagram of a down hole data logger in accordance with the present invention.

The preferred embodiments of the present invention will now be described with reference to FIGS. 1–16, wherein like components/steps are designated by like reference numerals throughout the various figures. As noted above, conventional data loggers can be inefficient, burdensome, and time-consuming to operate.

The data loggers of the present invention overcome the disadvantages of prior art data loggers. This is accomplished by providing data loggers that are easy to use, reliable, convenient, and accurate. In the following description, specific details and parameters such as specific data, sensor models, screen shots, configurations and the like are provided, which specific parameters are intended to be explanatory rather than limiting.

The data loggers of the present invention can record and store up to 30,000 or more time and date tagged data points from the user selected analog (e.g., 0–5 VDC or 4–20 mA, or other ranges) or digital sensor sources. The data loggers can further display real time and historical data on-board. In addition, the data loggers of the present invention can transmit data to a remote device via radio frequency in the unlicensed frequency range.

FIG. 1 illustrates a simplified diagram of a down hole data logger in accordance with the present invention. A down hole data logger 2 is used in applications such as in wells, tanks, fluid conveyances, pipes, conduits, streams, rivers, lakes, portable fluid monitoring devices, dams, subsurface monitoring at or near large civil or industrial work projects, etc. The data logger 2 includes an elongated shaft portion 4 and a top head portion 6. The length of the shaft portion 4 from top to bottom should be preferably between 12 to 16 inches, but may be shorter or longer. The diameter or cross sectional length of the shaft portion 4 should be small enough to fit into an opening that is about two inches or, which may be larger if additional functionalities are desired, as described hereinafter and will become apparent. In other words, the shaft portion 4 of the data logger 2 should be capable of being installed or deployed within a two inch or larger well, pipe, and the like. The installation or deployment process can be carried out by sliding the shaft portion 4 into the opening of the well, pipe, etc. Alternatively, the shaft portion 4 may be designed to fit into openings that have less than 2 inches of space. The shaft portion 4 may be cylindrical as shown or may be shaped in a different configuration so long as the shaft portion 4 can fit into small openings.

The head portion 6 of the data logger 2 includes a display 8 for viewing real time or historical data and sensor descriptions without using an external device. Preferably, the display 8 is an on-board LCD display (e.g., two line eight character display). Real time data can be displayed continuously on display 8 allowing the user to manipulate the sensor.

Also included in the head portion 6 is a function key button 10 for scrolling through the data logger functions. For example, the user can view the data logger serial number, time and date, battery voltage level, battery life remaining, real-time and historical data, logger self-test, etc. on the display 8 as the user pushes or activates the button 10. In other embodiments, there may be more than one button for scrolling through the data logger functions. The function key button 10 may be positioned on the side (as shown) or adjacent to the display 8 of the head portion 6.

Preferably, the diameter or cross sectional length of the head portion 6 should be larger than the diameter or cross sectional length of the shaft portion 4. Thus, when the data logger 2 is installed in a well or pipe, the head portion 6 prevents the entire data logger 2 from falling completely into the well or pipe because of its larger diameter or cross sectional length.

The data logger 2 can further include an external power jack (not shown) that permits instant connection to an external power source such as a solar or electrical power source. When an external power source is used, this avoids energy consumption of the on-board battery. In addition, the data logger 2 includes a computer connection terminal (not shown) such that an external device such as a computer can be hard wired to the data logger 2. The computer connection terminal is preferably a pin connector for connecting a computer device, such as a conventional nine pin connector. Further, the data logger includes a radio frequency (RF)

connection terminal (not shown) for connecting a RF cap having a transmitter, as described in more detail later herein. Other connection devices and methods may be used in accordance with the present invention. The communication medium between the data logger 2 and an external device is also described in more detail later herein with reference to FIG. 5.

Figure 2:
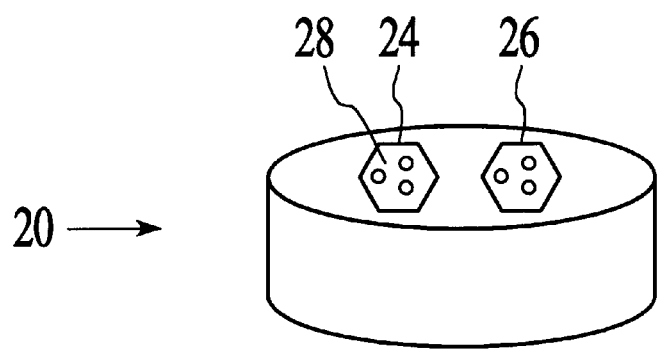
FIG. 2 illustrates a bottom lid having multiple sensor inputs that is placed on the down hole data logger in accordance with the present invention.

FIG. 2 illustrates a bottom lid having two sensor inputs that are placed on the down hole data logger. Two sensors are used with the data logger 2 so that the processing circuitry can be formed in a small enough package that allows for the data logger 2 to fit within a relatively small area, as described above. Less, such as a single sensor, or more sensors could also be used. A bottom lid 20 should be shaped such that it can easily fit into a bottom end 12 of the data logger 2. The bottom end 12 of the data logger 2 is an open end. The diameter or cross sectional length of the bottom lid 20 should be slightly smaller than the diameter or cross sectional length of the shaft portion 4 such that the bottom lid 20 fits snuggly within the bottom end 10. In other words, if the shaft portion 4 is cylindrical and has a diameter of about two inches, than the bottom lid 20 should also be cylindrical and have a diameter slightly less than two inches.

On a face 22 of the bottom lid 20, at least two sensor inputs 24, 26 are placed thereon. Sensor inputs 24, 26 are adapted to be used with a wide range of sensors or probes that are available, including analog or digital sensors. The data logger 2 may be used with one or two activated sensor inputs to log data. The logging time intervals for the sensor inputs 24, 26 are independently selected via software that is run on an external device, and used to set up the data logger, as described further hereinafter. The sensor inputs 24, 26 preferably include three prongs 28 for connecting to the sensors/probes. In other embodiments, such as in an above ground data logger, more than two sensor inputs may be used. Sensor inputs 24, 26 will be described in more detail later herein.

In operation, sensors or probes (not shown) are plugged into the sensor inputs 24, 26. Thereafter, upon placing the bottom lid 20 with the plugged sensors/probes into the bottom end 12 of the shaft portion 4, the data logger 2 can be installed in a well, pipe, or other operating environments for recording data.

The data loggers described herein are designed to record data from two or more sensors in a sequential manner. In other words, no two active sensors that are used with the data loggers presented herein record data simultaneously. For example, if two sensors on the same data logger are instructed to record data every minute, the logger will alternate recording data sensed from the different sensors, such that one sensor's data is first recorded, and then the other sensor's data is recorded after the first sensor is finished recording its data. Thereafter, a minute later, the first sensor's data will then be again recorded, and the process will continue.

Figure 3:
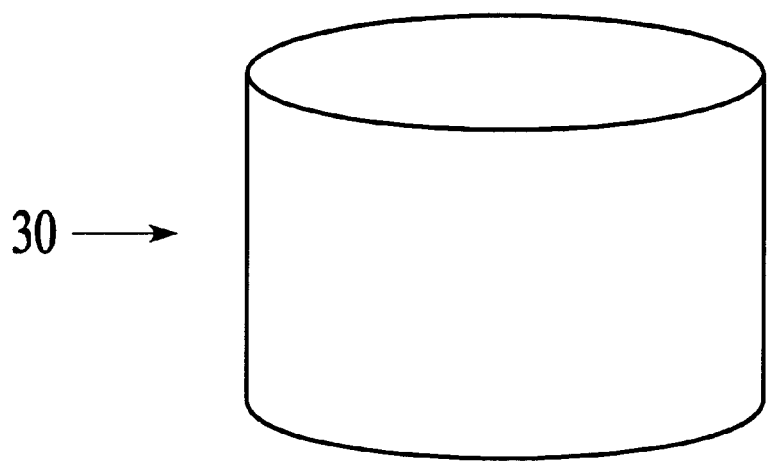
FIG. 3 illustrates a down hole data logger cap in accordance with the present invention.

In many instances when the data logger 2 is installed and is being used in the field, a protective housing or cap is generally used to protect the data logger 2, particularly the head portion 6, from the harsher conditions (i.e., rain, snow, dust, etc.) of the outside environment. For example, FIG. 3 illustrates a down hole data logger cap 30 used for protecting the data logger 2 in accordance with the present invention. The cap 30 is used to cover the head portion 6 of the data logger 2. The cap 30 is fitted snuggly or "snapped on" over the head portion 6. Thus, the display 8 and the button 10 may be hidden from view when the cap 30 is placed over the head portion 6.

Figure 4:
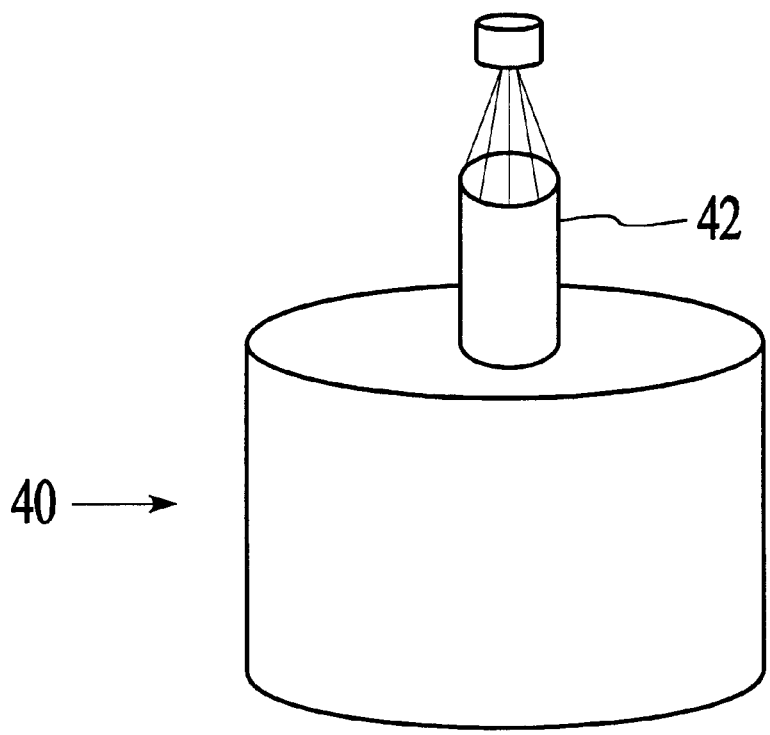
FIG. 4 illustrates a down hole data logger cap having a transmitter in accordance with the present invention.

In another embodiment, a different cap having a RF radio/transmitter may be used. For example, FIG. 4 illustrates a down hole data logger cap 40 having a transmitter 42 embedded therein. Similar to the cap 30 described above, the cap 40 is fitted snuggly or "snapped on" over the head portion 6 to protect the data logger 2. In addition, the cap 40 is connected to the data logger 2 via the RF connection terminal (not shown). The RF connection terminal preferably includes two prongs/connections for power and one prong/connection for data. The RF connection terminal is further coupled to an RS 232 port within the data logger 2. When the cap 40 is connected to the data logger 2, data recorded by the data logger 2 can be transmitted via RF to a remote external device by way of the transmitter 42. The external device would need to have a receiver and appropriate circuitry installed thereon for receiving the transmitted data.

Preferably, the frequency range in which the data is transmitted from the data logger 2 to the external device is between 900–928 MHz. Thus, the transmitter 42 should be capable of transmitting the data within the 900–928 MHz range. Such a transmitter 42 is commonly known in the field of radio frequency. The 900–928 MHz range is considered unlicensed or free frequency range and may be used by any person, business, etc., without obtaining a license or paying a fee to the U.S. Government. The FCC (Federal Communications Commission) is responsible for the regulation of all RF devices. These regulations are contained in the Code of Federal Regulations (CFR), Title 47. What is important from this example is that the transmitter 42 is capable of transmitting the recorded data in different frequency ranges should the conditions for unlicensed frequency range change. In other embodiments, the transmitter 42 can be designed to transmit data in the licensed frequency range. The transmitter 42 can be, for example, a transmitter such as the HP obtained from Linx Technologies of Oregon.

As stated earlier, the data logger 2 is typically installed in the outside environment. As a result, the outer surface of the shaft portion 4, head portion 6, and caps 30, 40 should be made from metal, plastic, composite, or any other material that is resistant to rust and can withstand the harsher environments of nature. Because the down hole logger 2 will be typically installed out in field, it is important that the materials used in making the shaft portion 4, head portion 6, and caps 30, 40 be made from a strong rigid material that can withstand adverse environmental conditions.

Figure 5:
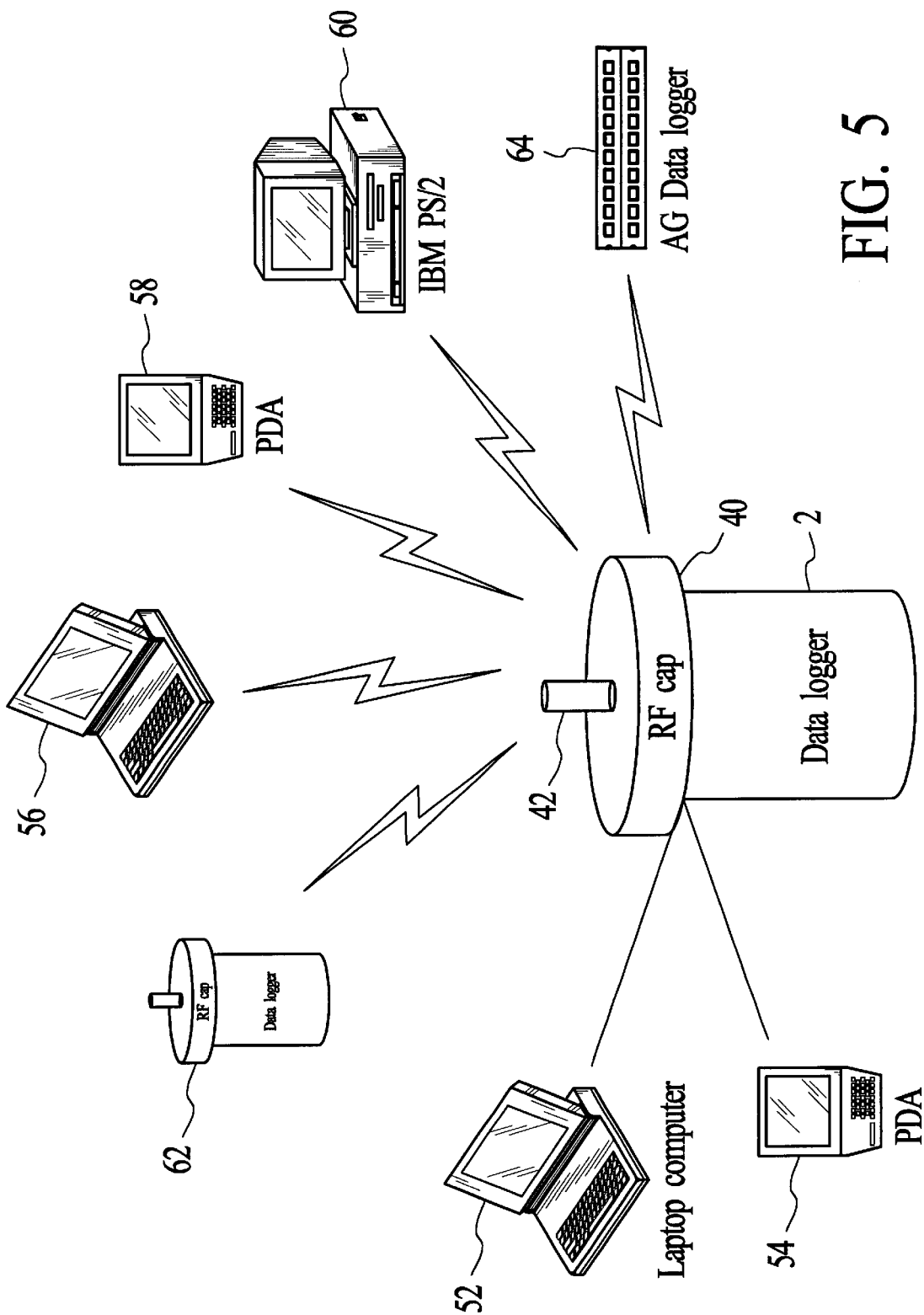
FIG. 5 illustrates a view of the down hole data logger communicating with external devices in accordance with the present invention.

FIG. 5 illustrates a view of a down hole data logger communicating with remote external devices in accordance with the present invention. The recorded and stored data in the data logger 2 can be downloaded and/or transmitted to another external device for data manipulation, analysis, and the like. The data logger 2 in FIG. 5 is assumed to be installed somewhere out in the field.

There are generally two different methods for sharing the recorded data that is stored in the data logger 2. In the first method, a computer type device can be directly connected to the data logger 2 via hard wire. For example, a first laptop computer 52 or a first portable digital assistant 54 (PDA), or any other computer device (not shown) can be connected via hard wire to the data logger 2 through a computer connection terminal. The computer connection terminal is preferably a conventional nine pin serial port, but other terminal connections may be used so long as the computer device can successfully retrieve data from the data logger 2. Using this method, a user will go into the field where the data logger 2 is installed and manually connect the laptop computer 52 or PDA 54 to the data logger 2. Thereafter, the data stored in the data logger 2 can be downloaded to the external device using the software loaded therein. When the data logger 2 is hard wired to the laptop computer 52 or PDA 54, set up information can also be provided to the data logger 2 by the laptop computer 52 or PDA 54. The set up information is described in more detail later herein. The user can also install a different sensor or sensors to the data logger 2 when the user is out in the field.

Radio frequency (RF) may be used as the second method for sharing the stored data in the data logger 2. The data logger 2 will have a RF cap 40 with a transmitter 42 that is capable of transmitting RF, preferably in the unlicensed or free frequency range (i.e., between 900–928 MHz), as mentioned previously. For example, RF can be used to transmit data to various remote external devices. Each remote external device will have installed therein a receiver and circuitry that is capable of receiving the transmitted data. A second laptop computer 56, a second PDA 58, or a desktop computer 60 may be used as the remote base station device for receiving the transmitted data. Alternatively, a second down hole data logger 62 having a RF receiving capability can be used to receive the data from the first down hole data logger 2. As will be described in more detail with reference to FIG. 7, an above ground data logger 64 can also receive the transmitted data via RF. Each remote base station device is capable of receiving data via RF from up to hundreds of data loggers. Using this method, the user can receive real time or historical data from a remote location, and the user does not need to physically go out to the field to retrieve the stored data. Preferably, the distance in which the external device can receive data via a repeater or receiving station via RF from a data logger in the field is typically around a quarter mile. Thus, using many repeaters, the data can be received by the receiving station many miles from the data logger. However, depending on the transmitter and receiver used in the data logger and external device, this distance can extend to many miles.

Figure 6:
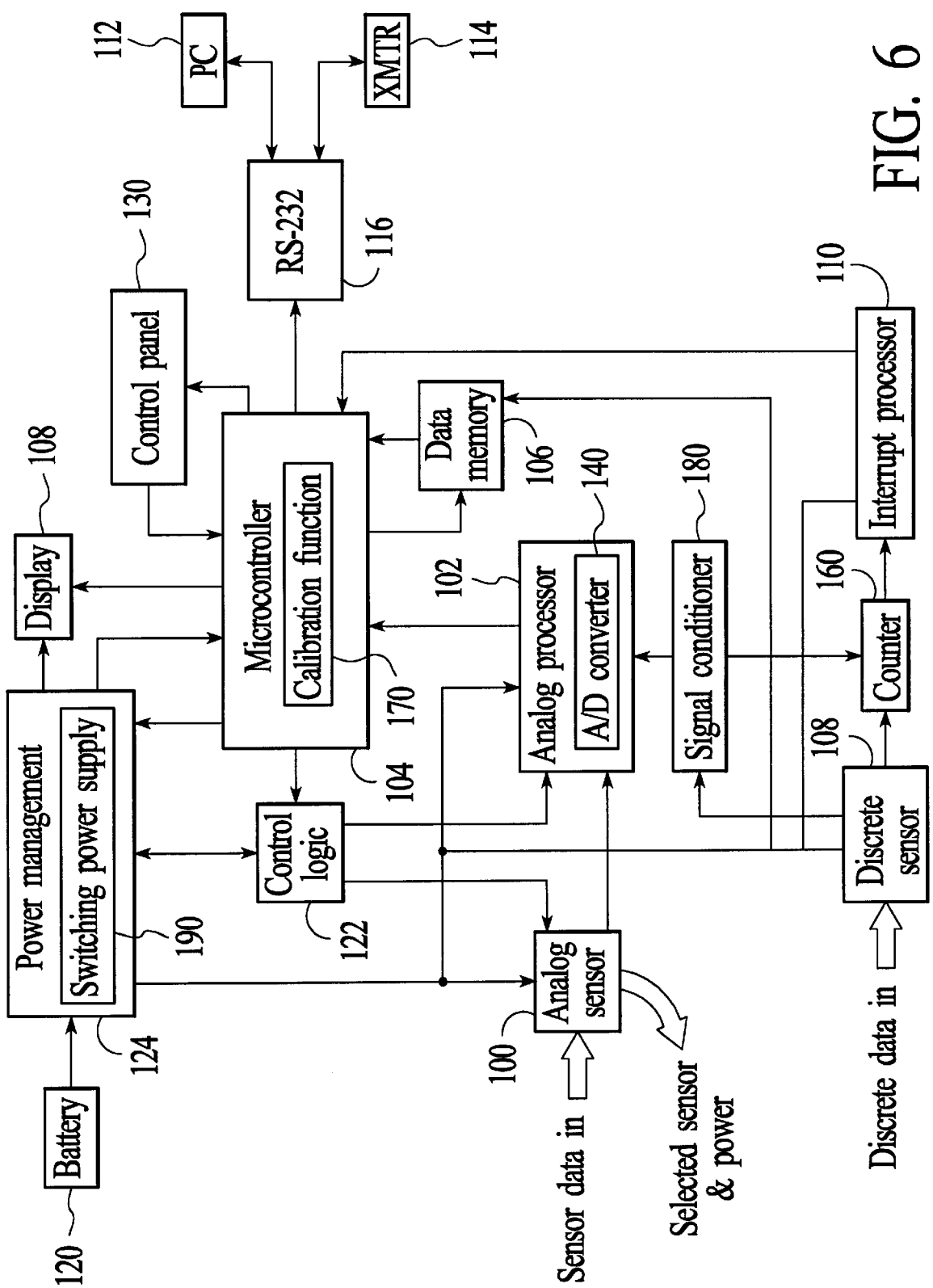
FIG. 6 illustrates a block diagram of the internal components of a data logger in accordance with the present invention.

FIG. 6 illustrates a block diagram of the internal or hardware components of a data logger in accordance with the present invention. The data logger of the present invention includes a microcontroller 104 that operates based upon firmware that contains a calibration function 170 and other functionalities necessary to ensure that the data logger 2 operates properly, as described hereinafter. The microcontroller 104 further includes a real time clock and is generally in a sleep mode until an interrupt signal is received, which may occur every second, minute, hour, etc, depending upon the interval that each sensor is set-up to sense the environmental conditions. An example of a microcontroller 104 that can be used in the data logger presented herein may be model number 87C530 manufactured by Dallas Semiconductor.

The calibration function 170 is used to calibrate components within the data logger, specifically the A/D converter assembly in the analog processor by comparing the instantaneous A–D range and scaling the sensor input range (e.g., 1–5 VDC) across the actual rather than theoretical count. The calibration function 170 increases the accuracy of the recorded data. Thus, the calibration function 170 ensures that the data recorded is accurate within, for example, .10%.

The microcontroller 104 is coupled to an RS-232 port 116, which in turn can be used to connect to a PC 112. Upon connecting the data logger to the PC 112, the data collected by the data logger can be sent to the PC 112 via the RS-232 port 116. The RS-232 port 116 can also be used to receive data, instructions, commands, etc. from the PC 112 to the data logger. Alternatively, the data collected by the data logger can be transmitted to another remote device using a transmitter 114, which is also coupled to the RS-232 interface 116. The transmitter 114 is similar to the transmitter 42 as described with reference to FIG. 4.

The microcontroller 104 also communicates with control logic 122, which in turn communicates with power management circuitry 124, each analog sensor 100, the discrete sensor 108, the analog processor 102, and the other elements that need to be controlled as in any microcontroller-based system, but which do not require further explanation herein. FIG. 6 only illustrates a single analog sensor 100, but it will be understood that two or more analog sensors can also be used. The control logic 122 and the power management circuitry 124 are used together to provide the appropriate switching and power (voltage) to the analog sensor 100. A switching power supply 190 within the power management 124 is given instructions from the microcontroller 104 to establish an output between 12–30 volts for any given channel. The control logic 122 is hard wired to the microcontroller 104 and includes Boolean circuitry that is programmed to interpret the commands received from the microcontroller 104 and cause the appropriate connections and events, as described further hereinafter, to occur in the appropriate sequence, so that proper operation results such as in switching channels. The control logic 122 also controls the power management 124.

In particular, as described further hereinafter, the microcontroller 104 sends commands to the control logic 122 for selecting a particular sensor, channel, type of measurement, etc. The control logic 122 then interprets these commands and sends the appropriate signals to the particular components, as described further hereinafter, which components are, the power management circuitry 124, the analog sensor 100, the analog processor 102, the discrete sensor 108, a counter 160 and an interrupt processor 110, thereby turning on the necessary components and conditioning the appropriate signal paths to receive data from a single sensor.

The power management circuitry 124 is coupled to a display 108, microcontroller 104, analog sensor 100, analog processor 102, discrete events sensor 108, and interrupt processor 110 for universal control/management of the power to these components. All of the above components, except the analog sensor 100 and the discrete events sensor 108, receive a Vcc voltage, as is known. Additionally, however, the power management circuitry 124 supplies an appropriate voltage to the analog sensor 100 and the discrete events sensor 108, depending upon which one is on, which voltage corresponds to the voltage needed in order to properly operate that analog sensor 100 or the discrete events sensor 108. The particular voltage needed is obtained from the sensor information that resides in the microcontroller 104, which will be described in further detail hereinafter. The power management circuitry 124 can be formed around a Maxim 686 model programmable voltage supply (i.e., switching power supply 190).

A battery 120 powers the data logger through a power management circuitry 124. The battery includes preferably three on-board high voltage AA batteries that provide at least 7200 mA hours of energy. In the case where two 4–20 mA sensors and three AA batteries are used, the data logger can log data at one-hour intervals for over 500 days without having to change the batteries.

Each analog sensor 100 is connected to the sensor inputs and is used to translate the appropriate environmental condition into sensed data that has some meaning and correspondence to the environmental condition. The sensed data may be in the form of voltage (e.g., 0–5 VDC), current (e.g., 4–20 mA), or pulsed data (discrete events). The analog processor 102 includes sensor type switch, such as a two-position switch (not shown), such that the position of the sensor type switch will change in dependence upon whether the sensor 100 that is being used is an analog current sensor or an analog voltage sensor. The state of the sensor type switch is controlled by the control logic circuitry, which, as will be apparent, sends the appropriate signals to the sensor type switch. The control logic is able to provide the appropriate signals based upon the information stored in the microcontroller 104, described further hereinafter. This allows, therefore, the analog to digital converter 140 within the analog processor 102 to be used for both current and voltage sensors.

When a voltage sensor is used, the sensor type switch is set in a first position to receive voltage data. Thus, the received voltage data is signal conditioned, as is known, and thereafter supplied to the analog to digital converter 140.

When a current sensor is used, the sensor type switch is set in a second position to receive current data. Thus, the received current data is signal conditioned, as is known, and thereafter supplied to a current to voltage converter (which may or may not be a part of the analog processor 102), which converts the received current data to a corresponding voltage value, as is known. The corresponding voltage value can then be supplied to the analog to digital converter 140.

As described above, the voltage data (whether in original form or converted from current data) or raw data is sent to the A/D converter 140 for converting the analog voltage data into digital data. The analog sensor 100 may any one of a wide variety of sensors as is known in the art. It should be noted that specific sensors and specific operating ranges are not a primary feature of the present invention, but rather the manner in which the present invention can, in a programmable manner, allow for selection between various sensors, and set-up of the data logger based upon the selected sensor with essentially no need to manually configure switches, voltages and the like, as described herein.

When the data logger is sensing a signal from an analog sensor 100, the control logic 122 will also configure the connection path such that data cannot be received from the discrete sensor. Similarly, when the pulsed data is received by the discrete sensor 108, and the pulses are counted by the pulse counter 160, the control logic 122 will configure that connection path such that data cannot be received from the analog sensor. Specifics regarding the operation of the discrete sensor 108 and the pulse counter 108 will be provided hereinafter.

It should also be noted that for certain high frequency pulses, however, that the present invention provides for a high pulse rate signal conditioning circuit 180 that can receive high rate pulses and convert such pulses into an analog current, which can then be processed as analog current data. In this configuration, the control logic 122 will configure that connection path such that data from the discrete sensor 108 is supplied to the high pulse rate signal conditioning circuit 180, which then supplies the resulting analog current to the analog processor 102 for processing as described, while ensuring that data cannot be received from the analog sensor.

The primary component of the analog processor 102 is the A/D converter 140, the switches as described to ensure that the correct signals are input to the A/D converter 140, and other signal conditioning circuitry as is known in the art. A specific A/D converter 140 that can withstand temperature and other environmental variations has been found to be a part number ICL1735CJI, as universally known. The A/D converter 140, as is known, converts the analog data into digital data, which digital data is recorded in certain time increments of for example, nanoseconds. The A/D converter 140 thereby converts and scales the input analog voltage data to, for example, a 16-bit values representing a point on the scale for each sensor. For instance, if the range of the voltage is 0–5V, and the analog sensor records 2.5V, then digital value stored to represent a value equal to 50% of the sensor scale.

The analog processor 102 also includes the switches for selecting data from the analog sensor and the discrete sensor via the signal conditioning circuit 180. The converted digital data from the analog processor 102 is then input into the microcontroller 104, and again the control logic 122 ensures that the correct data path exists for receiving the converted digital data. This converted digital data is then output by the microcontroller and stored in the data memory 106. The stored digital data can be displayed on the display 108, which is similar the display 8 of FIG. 1, or be retrieved or transmitted from/to an external computer, as discussed herein.

The data logger presented herein can also record discrete data using a discrete event sensor 108, as mentioned previously. For the discrete event sensor 108, a scaling factor is used. The scaling factor is a predetermined increment for assigning a value to recorded data. Examples of a discrete event include a rain gauge bucket that is tipped over after a certain amount of water is captured in the bucket or any event that causes an electrical count. Because the discrete pulse provides the information content, this pulse can be shaped and then used to increment the counter 160 for counting the number of events that has occurred. Using the example provided above, every time the rain gauge bucket is tipped over, the counter 160 is incremented. Whenever the counter 160 has a new count, it will signal the interrupt processor 1 10 that it has an updated count, such that the updated count can then be supplied to an appropriate portion of the memory.

The interrupt processor 110 alerts the microcontroller 104 that there exists an updated count, which can indicate that a predetermined number of discrete events have occurred or that a predetermined period of time has passed. For example, the interrupt processor 110 may alert and wake up the microcontroller 104 each time the rain bucket is tipped over. In other instances, the interrupt processor 110 may alert and wake up the microcontroller 104 after a certain period of time, for example one hour, to record the discrete data.

The interrupt processor 1 10 then causes the sending of the discrete data to the microcontroller 104. The discrete data can be stored in the data memory 106, displayed on display 108, or sent to the PC or other remote device via RS-232 port 116 and the transmitter 114.

As mentioned previously, in certain instances, the discrete data received by the discrete sensor 108 may be pulsing too rapidly for the counter 160 to count. A signal conditioner 180 is then used to convert the pulsed data into analog voltage data, which is then sent to the analog processor 102.

The data memory 106 may consist of non-volatile memory such that the data is saved even though the battery may be removed from the data logger or the data logger is damaged/destroyed. Non-volatile memory can consist of ROMs, EEPROMs, Flash memories, etc.

A control panel 130 is used to provide commands to the microcontroller 104. The control panel 130 can be a simple button as the button 10 in FIG. 1. Commands such as on/off, wake up, scrolling, and the like can be initiated using the control panel 130.

Figure 7:
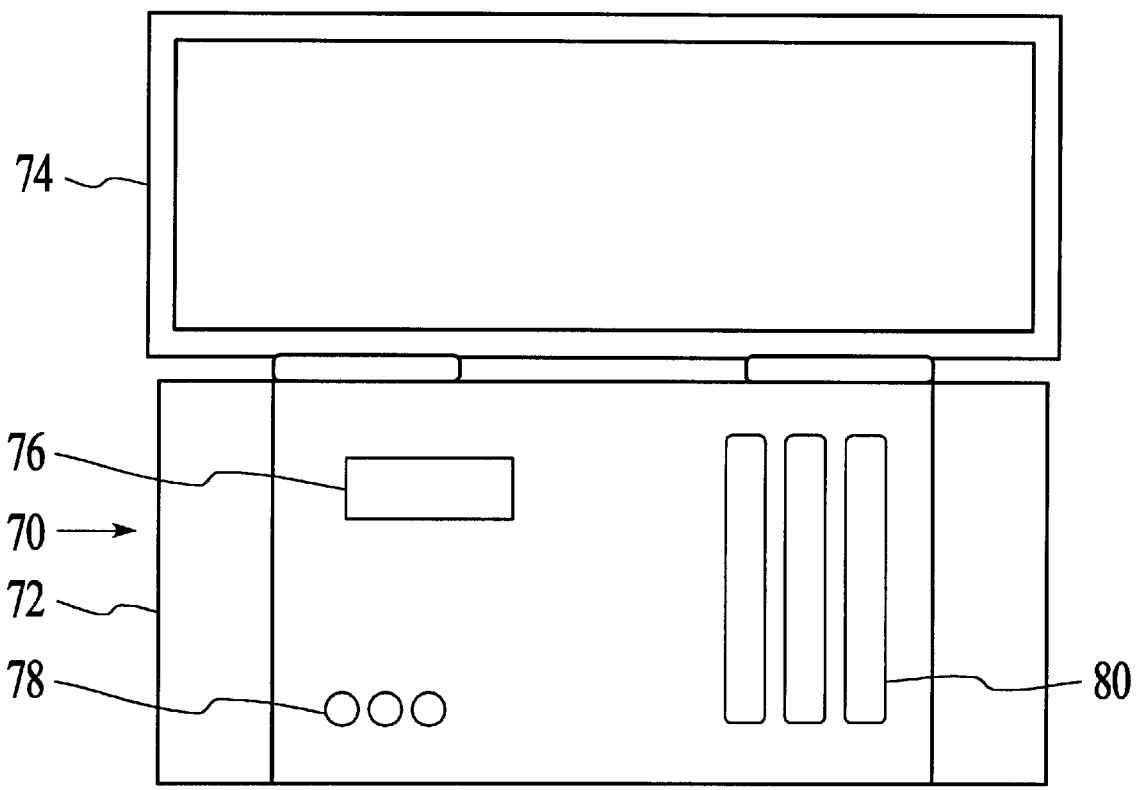
FIG. 7 illustrates a simplified diagram of an above ground data logger in accordance with the present invention.

FIG. 7 illustrates a diagram of an above ground data logger in accordance with the present invention. The internal components described above with reference to the down hole data logger 2 in FIG. 6 can be scaled and used as the internal components of the above ground data logger 70. For instance, due to the capacity of having a larger number of sensors, the memory will typically be of larger size. The above ground data logger 70 is similar to the down hole data logger 2 in functionality except that the above ground data logger 70 cannot fit into small openings. Unlike the down hold data logger 2, the above ground data logger 70 can include at least four channels because of its bigger size. The above ground data logger 70 can also include larger data memory, several serial ports, larger display area, and more control buttons than the down hole data logger 2. Again, three AA batteries can provide 7200 mA of energy, and up to 500 days of data recording or up to 300 days of transmitting data via unlicensed RF while using four 4–20 mA sensors that log data in one hour intervals. Other differences from the down hole data logger 2 include expandable circuit boards having relays, signal conditioner, and other optional components. This is because the above ground data logger 70 is considerably larger than the down hole data logger 2 and thus, can include additional features.

Referring back to FIG. 7, the above ground data logger 70 includes a base portion 72 and a lid portion 74. The lid portion 72 is used to provide protection to the base portion 72 while in the field. Preferably the width and length of the base and lid portions are approximately the same. The base portion 70 includes a display 76, control buttons 78, battery packs 80, external power inputs (not shown), and RS-232 port (not shown). The bottom of the base portion 72 includes sensor inputs (not shown) and other connectors such as nine pin connectors.

Figure 8:
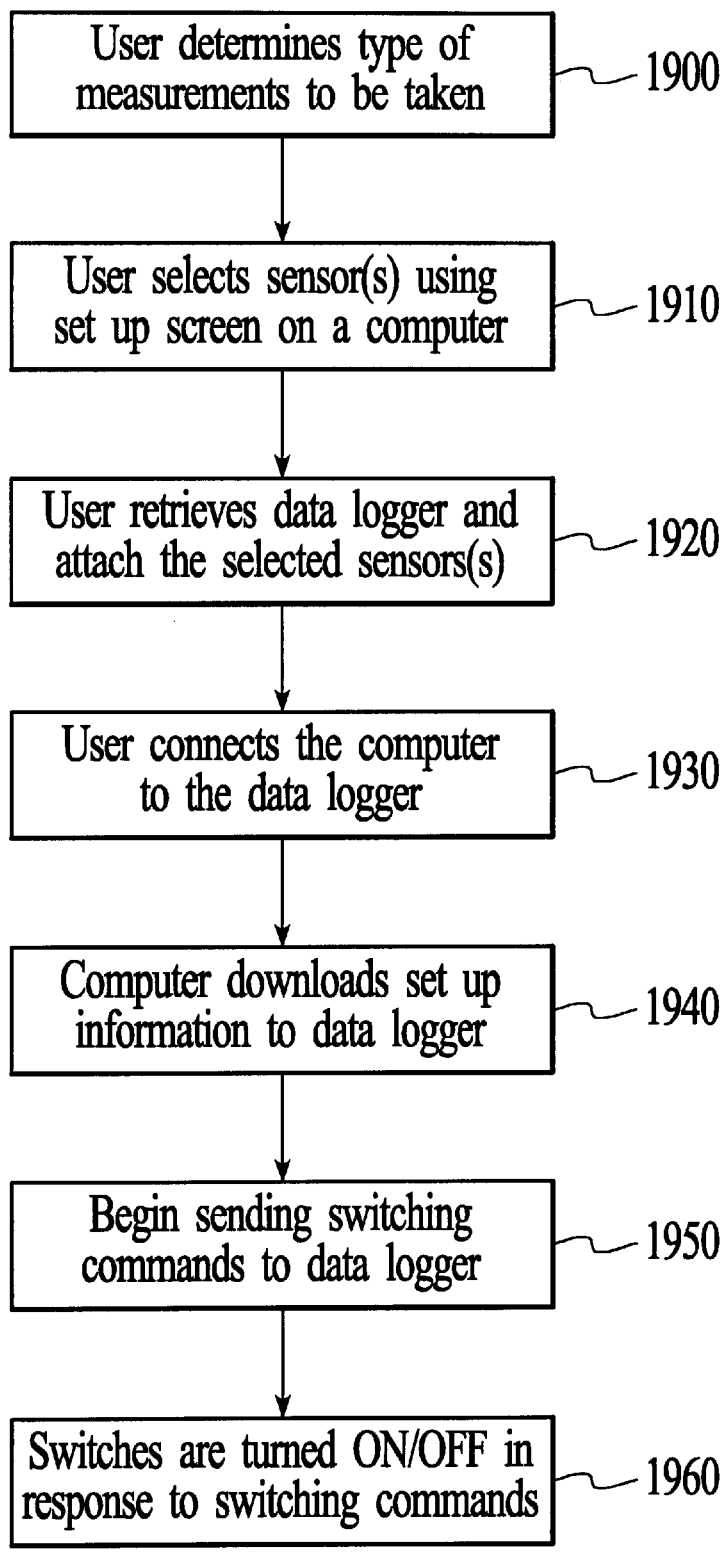
FIG. 8 illustrates a flow chart for describing the set up operations of the data logger in accordance with the present invention.

FIG. 8 illustrates a flow chart for describing the set up operations of the data logger of the present invention. A user determines what types of measurements and data are to be collected by the data logger in step 1900. Using the set up screens available to the user on a computer device, as described in more detail later herein, the user selects the appropriate sensor or sensors and corresponding information for that particular sensor(s) in step 1910. The user can also select which sensor is to be active or inactive using the set up screens. The user can then retrieve the data logger and plug in/attach the selected sensor to the data logger in step 1920. The user then connects the computer to the data logger via a connection (e.g., nine pin connection) in step 1930 and sends the set up information to the data logger. The computer then downloads the set up information to the data logger in step 1940. Through an RS-232 port, for example, a microcontroller and firmware in the data logger initiates the internal switching of the data logger such that the particular sensor can be used to collect measurements in step 1950. The power management circuitry in conjunction with the microcontroller and the control logic transmit commands to one or more switches (e.g., FETs) within the data logger circuit, particularly in the analog processor, and these switches are then turn ON/OFF according to the type of sensor and measurements required in step 1960. Thus, the switching of the switches within the data logger allows the data logger to receive data via voltage, current, or pulse. In this manner, the switching within the data logger is performed via software and no manual switching within the data logger by the user is necessary.

Figure 9:
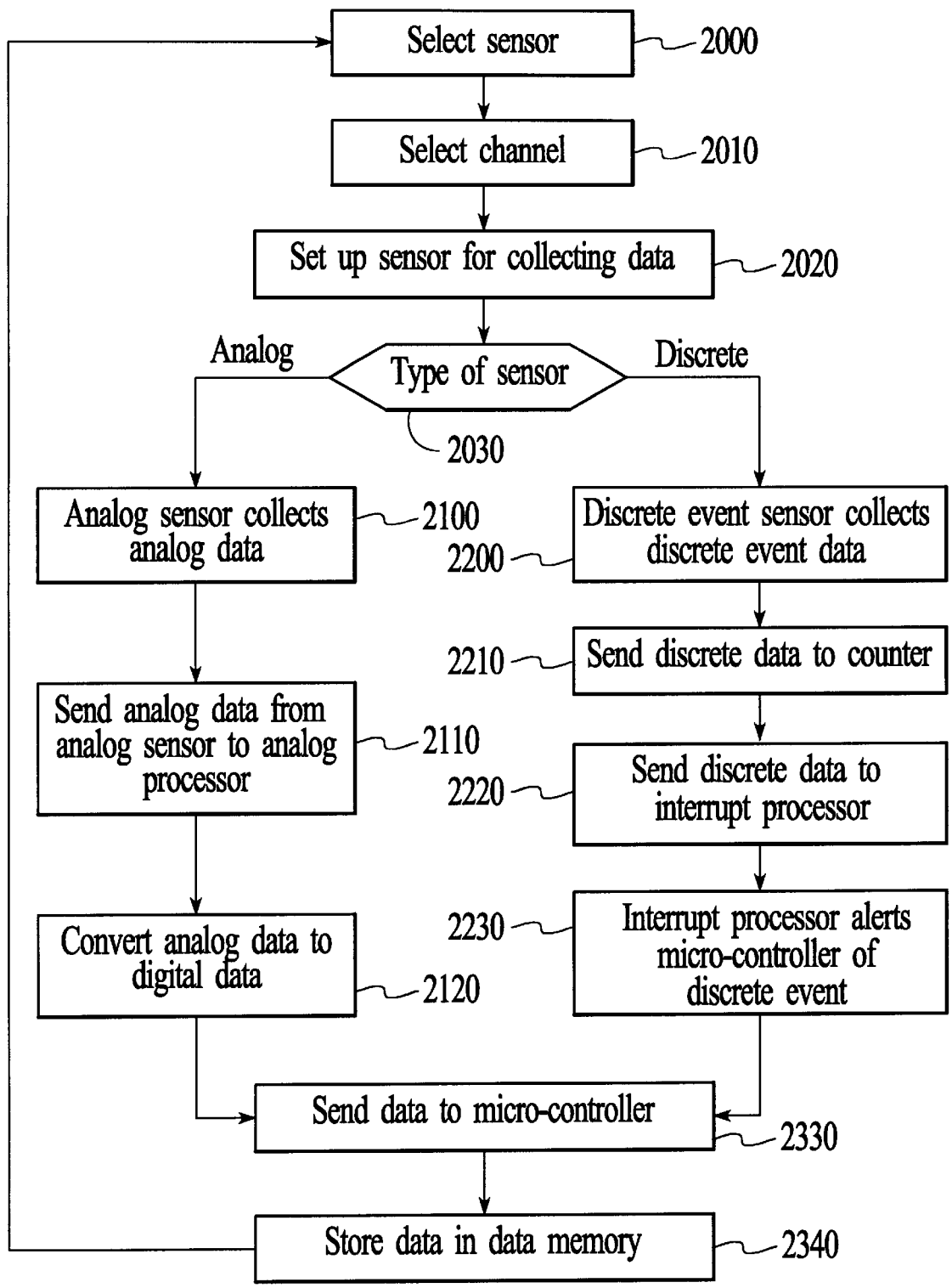
FIG. 9 illustrates a flow chart for collecting and storing data using the data logger in accordance with the present invention.

FIG. 9 illustrates a flow chart for collecting and storing data using the data logger of the present invention. This flow chart assumes that a microcontroller in the data logger has received the necessary information from an external computer regarding the sensors that are connected to the data logger, which necessary information is described below. The flow chart also assumes that two sensors are connected to the data logger, but in other embodiments as described above, more than two sensors can be connected to the data logger. While described as a sequence of steps, these steps are set forth for purposes of understanding the operation of the data logger, and in actual use are not necessarily discrete as described, but instead provide a continuous progression of operation, as will become apparent.

The microcontroller in the data logger first selects one of the sensors for collecting and storing data in step 2000. This step may be caused by the preset timing interval associated for each sensor. For example, data from a first sensor is preset to collect data every minute while a second sensor is preset to collect data every hour. Upon selecting the sensor, the microcontroller sends this control command to the control logic, which in turn sends it to the power management circuitry and the analog processor. Next, in step 2010, the microcontroller selects one of the two channels such that the selected channel is activated. The channel selection command is likewise sent to the control logic for processing, similar to that described above. Thereafter, certain switches (FETs) in the circuitry of the data logger are turned either ON/OFF for the particular sensor and channel, as described in more detail earlier.

Once the sensor and channel is selected, the selected sensor is set up for collecting data in step 2020. Set-up preferably includes temperature calibration of the A/D converter as discussed above, and provides a predetermined warm-up time, which can vary from a few milliseconds to 60 seconds depending on the sensor, so that the sensor accurately senses the environmental condition. The appropriate voltage needs to be supplied to the sensor for warm-up of the sensor, and this voltage is obtained from the information relating to the sensor and input into the microcontroller, as has been described. The high and low values are used to set the scaling factor for the discrete sensor and is used to convert event counts to engineering units. After setting up the sensor in step 2020, either the analog or discrete event sensor will collect a sample of data as shown in step 2030.

First, when the data is analog data, an analog sensor collects a sample of data in step 2100. As stated earlier, the analog sensor is previously set up to collect the data either in voltage or current with the aid of the software in the external computer, the firmware in the microcontroller, and other internal components (e.g., control logic) as has been described previously. The data is then sent to an analog processor in step 2110 where an A/D converter converts the sample of analog data to digital data in step 2120. The converted digital data is then transmitted to the microcontroller in step 2330. The microcontroller stores the received data in a data memory for future use in step 2340.

Second, discrete data is collected by a discrete event sensor, as shown in step 2200. Generally, no calibration is required for the discrete event sensor. When a pulse is received, the pulse is sent to the counter in step 2210, thereby incrementing the counter, which then sends the data to the interrupt processor in step 2220. The interrupt processor, in step 2230, alerts the microcontroller that an event (e.g., discrete event or certain passage of time) has occurred. The interrupt processor thus provides the microcontroller advance warning that data from the counter will be sent to the microcontroller. Thus, having received the interrupt request, the microcontroller, in association with the control logic as described previously, can prioritize when to receive the data from the counter such that data from the counter is not transmitted at the same time as data from an analog sensor. The microcontroller receives the current counter count, corresponding to the discrete event, in step 2330. It then stores this count, also termed discrete data, in a data memory for future use in step 2340.

Preferably, after the analog or discrete data is stored in the data memory 2340, the steps outlined above are repeated beginning from step 2000. In this manner, data is continuously collected during the preset time intervals or whenever a discrete event occurs. The process beginning from step 2000 is repeated regardless of whether the same sensor and channel is used or a different sensor and/or channel is used for subsequent data recording. The microcontroller selects the sensor and channel and recalibrates the A/D converter such that the new data can be collected and stored.

An important feature of the data loggers of the present invention is that they allow the user to quickly and efficiently install, setup, download, manipulate, analyze, etc. the data logger settings, as well as efficiently output the recorded data in a variety of formats, as has been discussed. The relative ease with which the data loggers of the present invention can be efficiently set up and used as mentioned above will be further described with reference to the following screen shots, which illustrates in a different manner the set-up information that is required, as well as to help understand the information that is provided to the microcontroller so that it can operate as described above. These screen shots illustrate the necessary information that is provided to the microcontroller according to the present invention, which is in addition to the information provided by software used to load/unload a conventional data logger, such that the functionalities and advantages of the present invention can be achieved.

Figure 10:
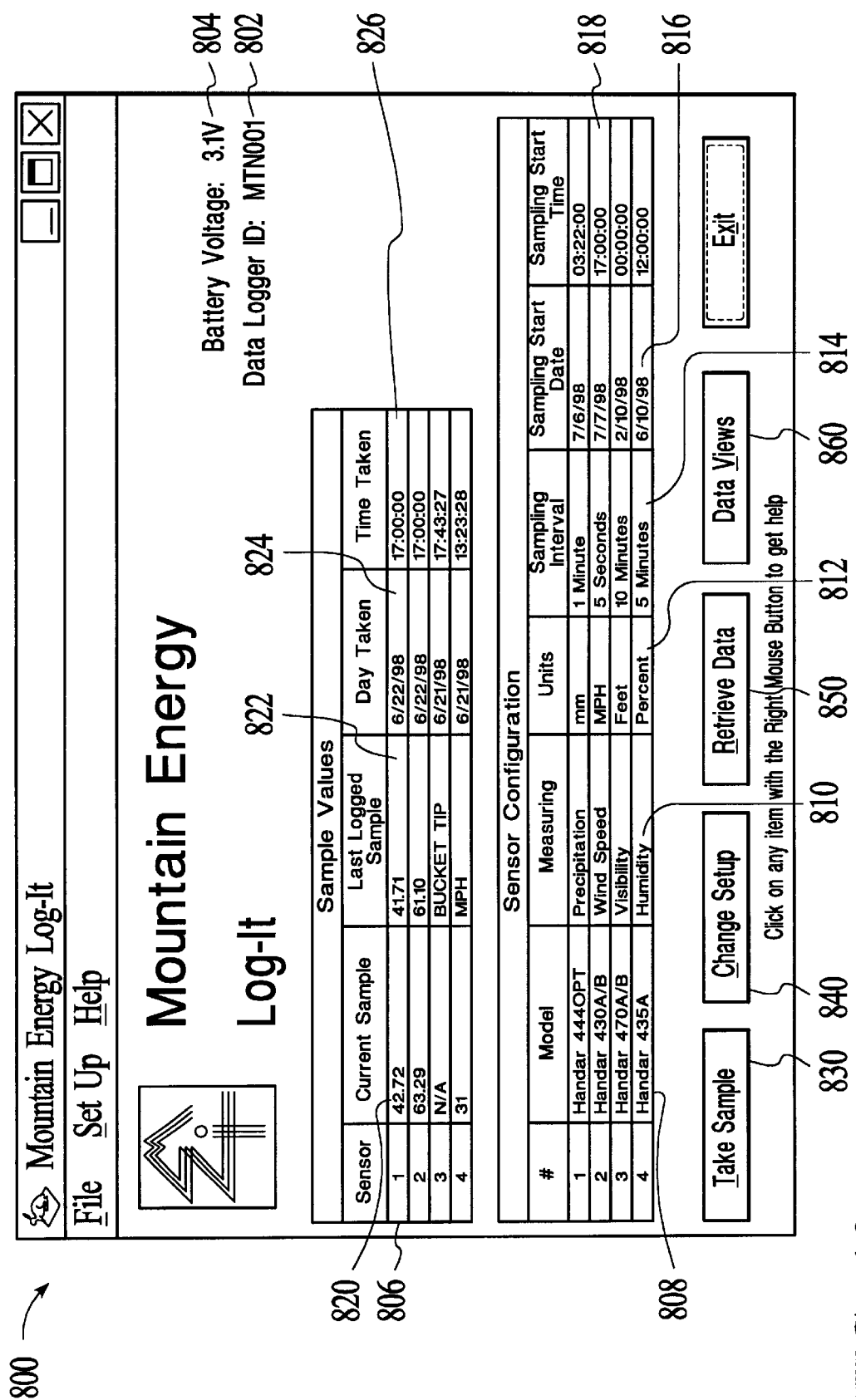
FIG. 10 illustrates a main user interface window displayed on an external device in accordance with the present invention.

FIG. 10 illustrates a main user interface window presented to a user on an external device in accordance with the present invention. As described earlier, the external device may be a laptop or desktop computer, PDA, or any other computer related device that is capable of running the software. Each external device having the software installed thereon can include information about different data loggers and the associated sensors that are deployed/installed in the field. Again, the external device preferably is also capable of receiving data from a data logger via hardwire or RF signals if desired.

The main window 800 displays information relating to a data logger having an identification number MTN001 as shown in the Data Logger ID box 802. Each data logger will have a unique data logger ID number set by the user for identification purposes. For the data logger with ID number MTN001, the real time battery voltage of 3.1 V is also displayed in the Battery Voltage box 804.

The main window 800 also displays the sensor configuration information such as the number of sensors associated with the particular data logger and corresponding information relating to the sensors. For example, the data logger with ID number MTN001 has four sensors attached thereto as shown under the Number row 806. The sensors' model make and numbers are shown under the Model row 808. The main window 800 also shows the type of measurements along with its measurement units associated with each sensor in the Measuring description row 810 and Units row 812, respectively. The sampling interval along with the sampling start date and time is also shown in the Sampling Interval row 814, Sampling Start Date row 816, and Sampling Start Time row 818, respectively.

The main window 800 also displays information about the data that has been recorded by each sensor. For example, the most current sample recorded by each sensor along with the day and time recorded are shown in the Current Sample row 820, Day Taken row 824, and Time Taken row 826, respectively. Also, data regarding the previously logged sample is shown in the Last Logged Sample row 822.

The main window 800 can also be used to initiate a command and/or access other screens for additional information associated with the data logger. For example, a user can initiate a Take Sample button 830 by clicking it to request the data logger to activate a sensor and collect data, which can be repetitively performed. The user can alternatively click on the Change Setup button 840 to access a set up window, as described in more detail later herein.

The user may also initiate the Retrieve Data button 850 in the main window 800. When the Retrieve data button 850 is initiated, this will begin the process of uploading the recorded data from the data logger. As discussed earlier, the data from the data logger can be transmitted to the external device via conventional hardwire or RF. Upon receiving the data from the data logger, the external device will store the data in its database. Thereafter, the external device will send the clear data command to the data logger to clear/erase the old data from the data logger's data memory. This will allow the data logger to record new data in the data memory.

Once data is sent to the external device, the user can view such data either in tabulated or graphical form (raw or engineering units). The user can initiate the Data Views button 860 and this will prompt the user to the tabulated or graphical screens as shown in FIGS. 11–12B.

Figure 11:
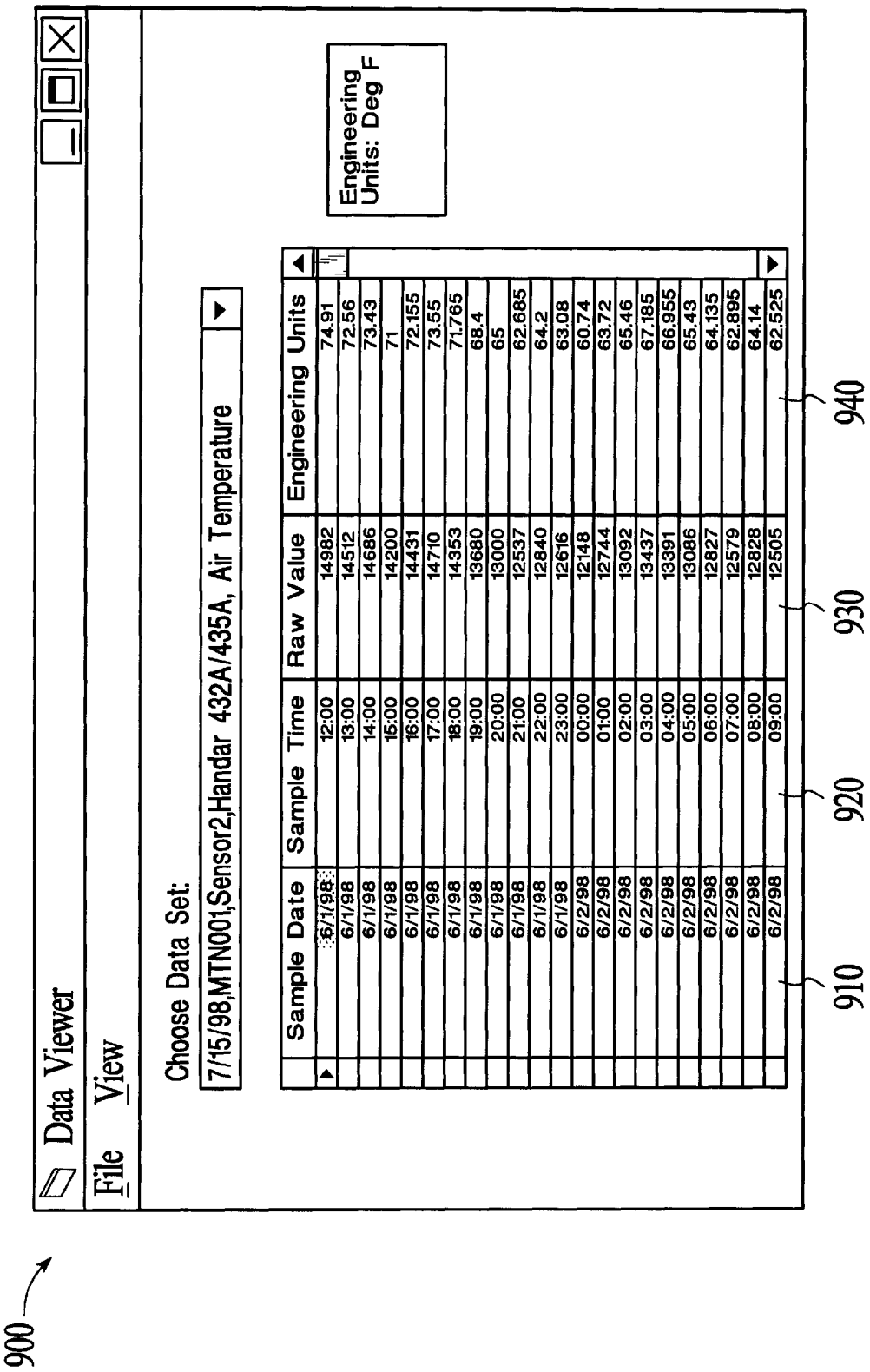
FIG. 11 illustrates a tabulated data window displayed on an external device for viewing the recorded data in accordance with the present invention.
Figure 12A:
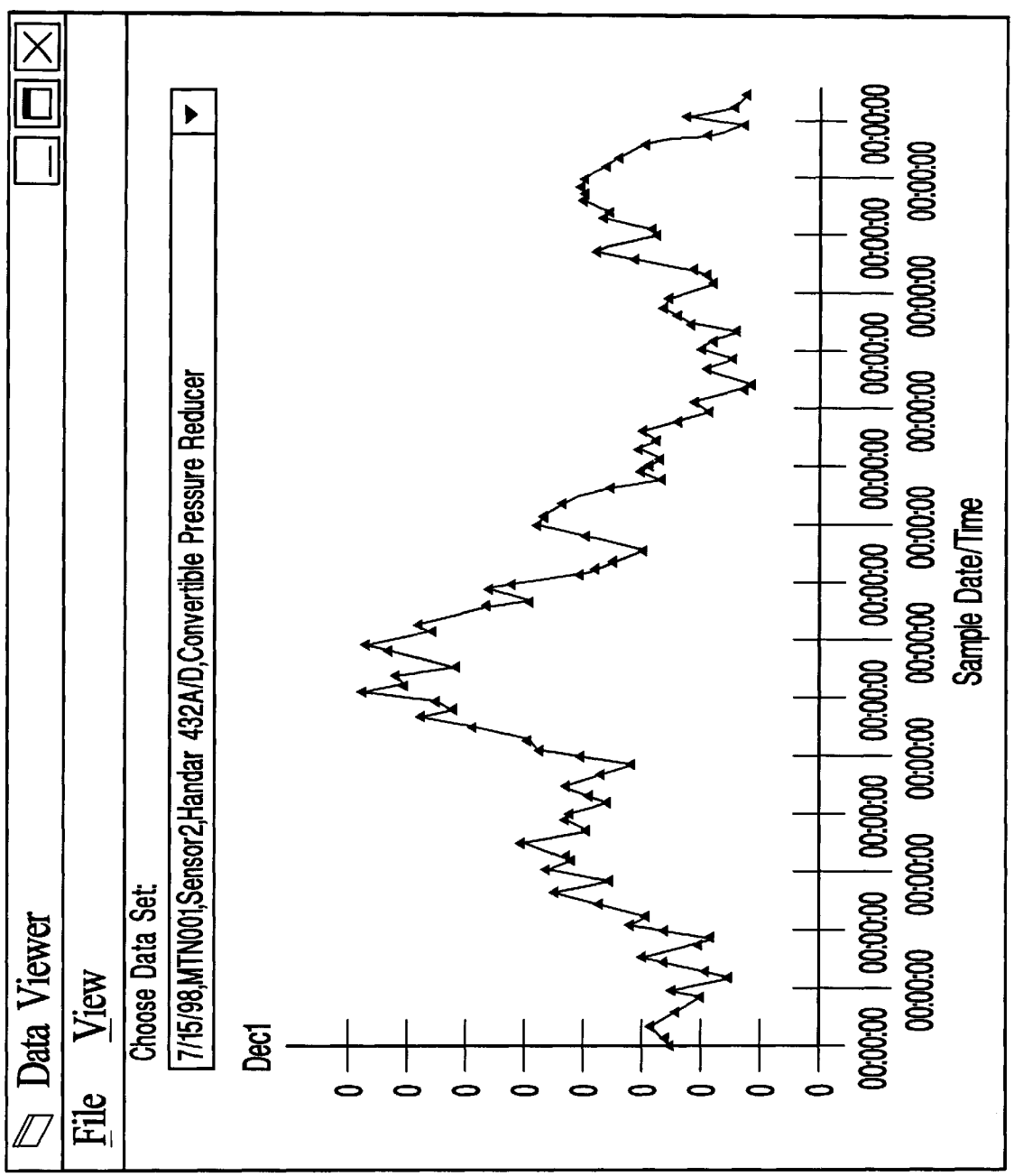
FIGS. 12A–12B illustrate graphical data windows displayed on an external device for viewing the recorded data in accordance with the present invention.
Figure 12B:
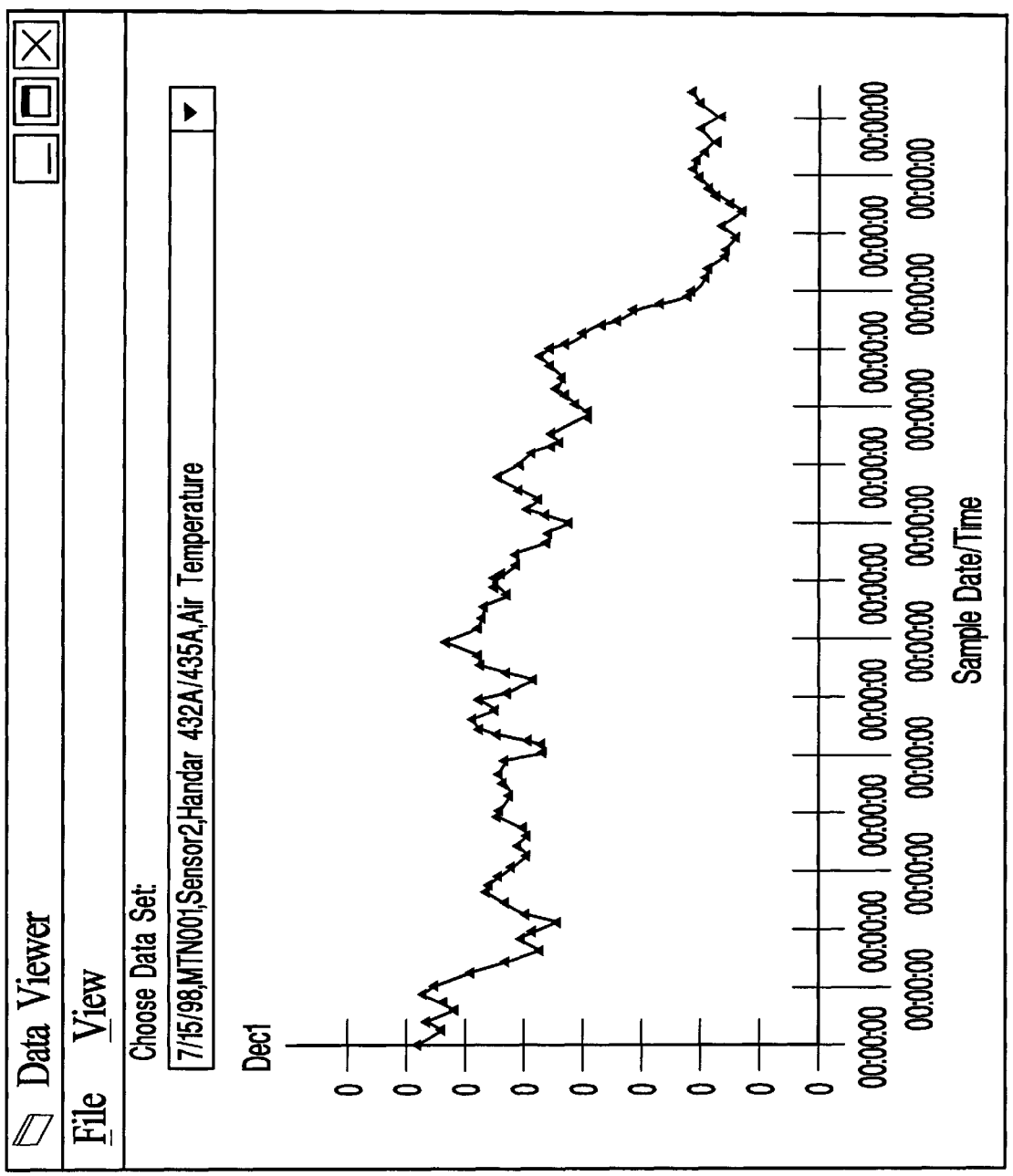

FIG. 11 illustrates a tabulated data window 900 displayed on an external device for viewing the recorded data in accordance with the present invention. The tabulated data window 900 includes a sample date row 910, a sample time row 920, a raw value row 930, and engineering units row 940. FIGS. 12A–12B illustrate graphical data windows 1000, 1010 displayed on an external device for viewing the recorded data in accordance with the present invention. The previous data view windows 900, 1000, 1010 are displayed only for illustrative purposes and are intended to be explanatory rather than limiting. Thus, other data view windows can be displayed to the user in the present invention. Further, data received by the external computer via RF from the data logger can be presented to the user in both the tabulated and graphical screens as shown in FIGS. 11–12B.

Figure 13:
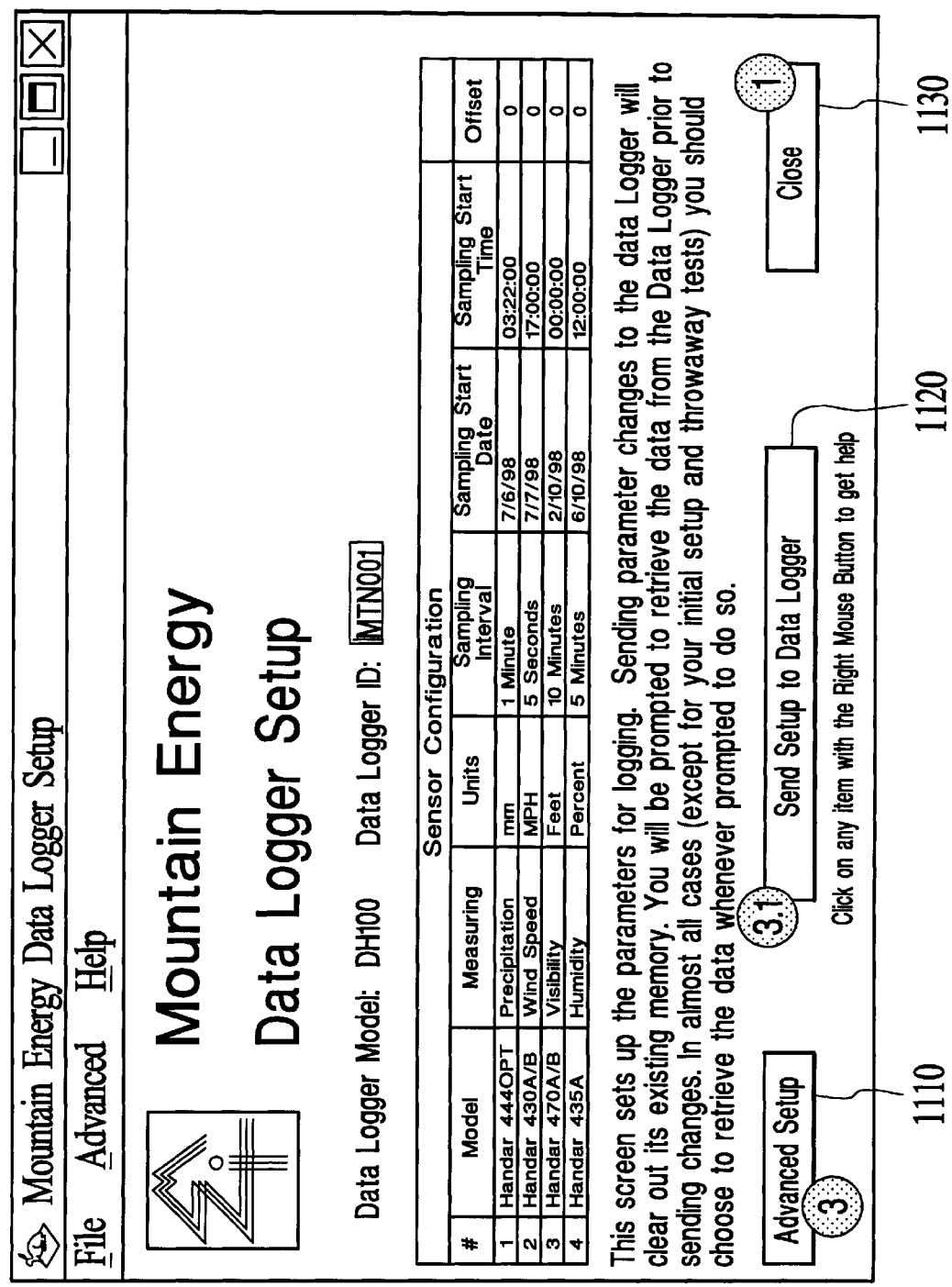
FIG. 13 illustrates a set up window displayed on an external device for setting up a data logger in accordance with the present invention.

Referring back to FIG. 10, the user can initiate the Change Setup button 840 to access a set up window. FIG. 13 illustrates a Setup window 1100 displayed on an external device for setting up the data logger. The external device would need to be connected to the data logger for changing the parameters of the data logger. The user can decide which sensor model and part numbers are to be used with the data logger. Once the user has decided which sensors are to be used in conjunction with the data logger, the corresponding units, sampling time intervals, sampling start dates and times, and offset value can be set in the Setup window 1100, which form a portion of the necessary information that is supplied to the microcontroller The user can further initiate an Advanced Setup button 1110 for accessing an Advanced Setup window. FIG. 14 illustrates an Advanced Setup window 1200 displayed on an external device in accordance with the present invention.

Clicking on the Manufacturer Finder button 1210 drops down a list of all sensor manufacturers in the database. When a manufacture's name is chosen, the name appears in the box to the right of the Manufacturer Finder button 1210, and all the manufacturer's sensors appear in the list it. The Advance Setup window 1200 displays information about the description, model number, measuring parameters, measuring units, operating voltage, sensor type and reporting format, low and high values, scaling factor and warm-up time associated with each of the manufacturers' sensors, and the corresponding values form another portion of the necessary information used by the microcontroller.

When a sensor is a discrete sensor, a scaling factor is shown in the Advanced Setup Window 1200. For analog sensors, low and high values are used to assist in transforming the raw data values to engineering units (e.g., Watts, Volts, ° F., ° C.).

The window 1200 illustrates that precipitation can be measured using a rain gauge tipping bucket with a discrete type sensor or an optical rain gauge using analog voltage sensor. Next, temperature can be measured using a temperature sensor, 12.5V, and a current type sensor. Further, humidity can be measured using either a voltage or current type sensor. Other examples illustrated in FIG. 14 are intended to be explanatory rather than limiting.

When a sensor in the database is no longer used, it can be deleted from the database by using a Delete Selected Sensor button 1220. On the other hand, when a new sensor is to be added into the database, an Add Sensor for Current Manufacturer button 1230 can be used. Furthermore, a new manufacturer data can be entered into the database using the Add Manufacturer button 1240.

Referring back to FIG. 13, the user can initiate the Send Setup to Data logger button 1120 to send the setup parameters to the data logger. When new setup parameter are sent to the data logger, this will typically clear out the existing memory of the data logger. Thus, if the user has not done so already, it is beneficial for the user to retrieve the recorded data from the data logger before sending the new setup parameter. When the user initiates the Send Setup to Data logger button 1120, a warning window will be displayed on the external device.

Figures 15, 16:
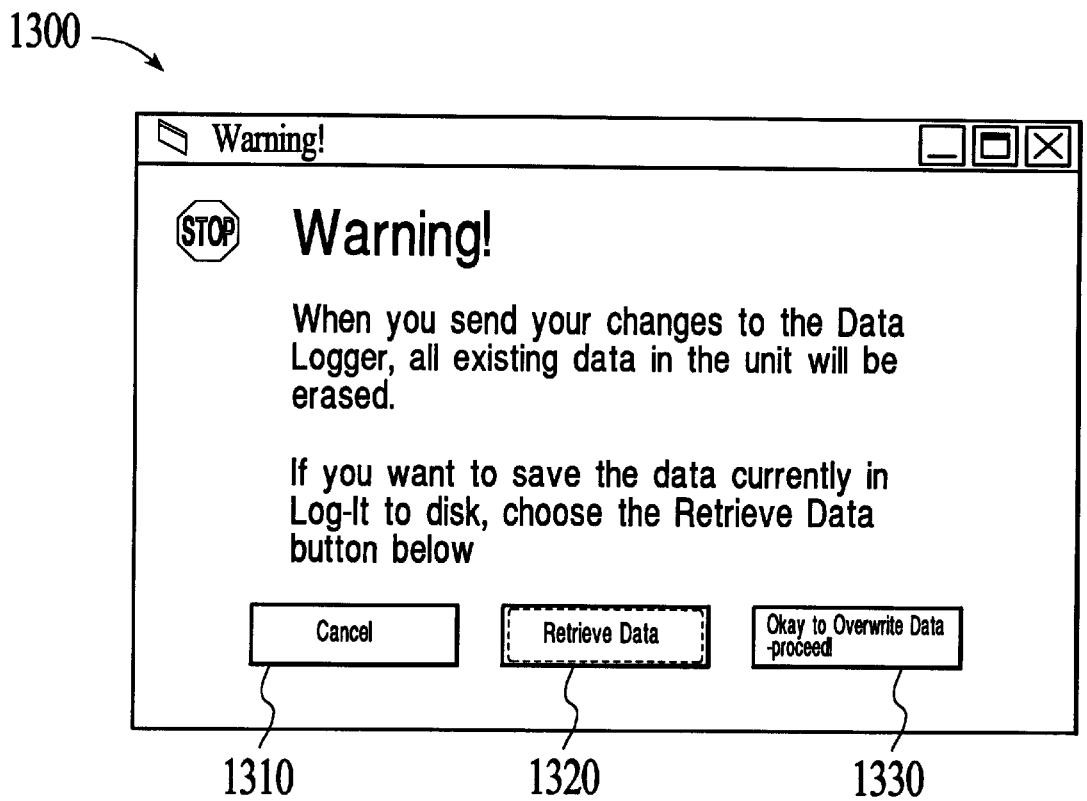
FIG. 15 illustrates a warning window displayed on an external device in accordance with the present invention.
FIG. 16 illustrates a window displayed on an external device for selecting a particular data logger for receiving data in accordance with the present invention.

FIG. 15 illustrates a warning window 1300 displayed on an external device in accordance with the present invention. The warning window 1300 will state that when the changes to the data logger are sent, all existing data in the data logger will be erased. The user may decide not to proceed with sending the parameter changes to the data logger and initiate the Cancel button 1310. Alternatively, the user may want to retrieve the recorded data in the data logger and initiate the Retrieve Data button 1320. This will begin the process of retrieving the data as described earlier with reference to FIG. 10. The user may alternatively choose to ignore the warning and initiate the OK to Overwrite Data button 1330.

FIG. 16 illustrates a window displayed on an external device for selecting a particular data logger for receiving data in accordance with the present invention. As described earlier, the data logger of the present invention can transmit data via RF using a cap with a radio/transmitter in a low power, unlicensed frequency range. The user can view and receive data from one of the many data loggers out in the field so long as the data logger includes a transmitter cap and the user's computer device includes a receiver and appropriate circuitry. The user selects a data logger from the Data Logger ID library that is stored in the user's computer. For example, in FIG. 16, a data logger having ID MTN001 is selected in the Data Logger ID box 1510. Once the data logger MTN001 is selected, the computer records the data from that particular data logger. The user can also select to record the data from particular sensors that are connected to the data logger MTN001 using the Sensor Information box 1520. The data logger MTN001 is assumed to have four sensors attached thereto for collecting data. Using this user interface, the user may select only those sensors of interest such that data from the selected sensors are recorded by the computer.

In the previous descriptions, numerous specific details are set forth, such as specific materials, structures, lengths, frequencies, components, screen shots, etc., to provide a thorough understanding of the present invention. However, as one having ordinary skill in the art would recognize, the present invention can be practiced without resorting to the details specifically set forth. Although various preferred embodiments have been described in detail above, those skilled in the art will readily appreciate that many modifications of the exemplary embodiment are possible without materially departing from the novel teachings and advantages of this invention.

I claim:

1. A data logger for collecting analog data or discrete data using a connected analog sensor or a connected discrete sensor, comprising:

a substantially cylindrical tube and a top and a bottom, and including disposed within the tube:

a microcontroller coupled to control logic and power management circuitry bit and adapted to send commands to the control logic and instructions to the power management circuitry;

an analog processor capable of being electrically coupled to any connected analog sensor and adapted to receive analog data therefrom, wherein any connected analog sensor is adapted to receive sensor selection signals from the control logic and voltage selection signals from the power management circuitry, and wherein the analog processor is adapted to convert the analog data to digital data and transmit the digital data to the microcontroller;

a discrete sensor counter electrically coupled to any connected discrete sensor and adapted to receive discrete data from any connected discrete sensor and output counter output data;

a data memory coupled to the microcontroller and adapted to store as real-time data the digital data and the counter output data; and a battery coupled to the power management circuitry;

a bottom cap mechanically connected to the bottom of the tube and allowing for the mechanical connection of an analog sensor and a discrete sensor thereto, and thereby being electrically coupled to the analog processor and the discrete sensor counter; and a top cap mechanically connected to the top of the tube and including thereon a digital display that is coupled to the microcontroller and capable of displaying the real-time data and a description of each connected sensor at different periods of time.

2. A method for collecting data from a data collection location using a sensor coupled to a data logger for collecting the data and transmitting the collected data to an external device using a radio frequency, the method comprising the steps of:

selecting the sensor;

inserting the selected sensor into a bottom cap of the data logger;

mechanically attaching the bottom cap of the data logger to a cylindrical body of the data logger, thereby electrically coupling the selected sensor to a microcontroller disposed within the cylindrical body of the data logger;

selecting a channel in the data logger associated with the selected sensor;

calibrating the selected sensor for subsequently collecting data;

testing the data logger by viewing test information on a display disposed on a top cap of the data logger;

mechanically attaching a removable protective radio frequency cover having a radio frequency transmitter disposed therein over at least a top surface of the top cap of the data logger so that the radio frequency transmitter becomes electrically coupled between the microcontroller and an antenna disposed on the protective radio frequency cover, and the protective radio frequency cover mechanically covers the display;

disposing the data logger at the data collection location;

collecting the data at the data collection location using the selected sensor;

sending the collected data to the microcontroller;

storing the collected data in a data memory, wherein the data memory is disposed within the cylindrical body of the data logger, is coupled to the microcontroller and is adapted to receive the collected data from the microcontroller; and transmitting the collected data to the external device at the radio frequency using the radio frequency transmitter.

3. The data logger according to claim 1 further comprising an interface port coupled to the microcontroller and disposed within the tube, the interface port adapted to interface the microcontroller to one of an external computer device and a radio frequency transmitter.

4. The data logger according to claim 3, wherein the radio frequency transmitter is adapted to transmit radio frequency signals in the 900–928 MHz range.

5. The data logger according to claim 3, wherein the external computer device is adapted to download the stored data from the data memory.

6. The data logger according to claim 3, wherein the external computer device is adapted to upload set up instructions to the microcontroller.

7. The data logger according to claim 6, wherein the set up instructions comprises the commands for sensor selection and the instructions for voltage selection.

8. The data logger according to claim 1, wherein the power management circuitry includes a switching power supply for switching output voltages in the 12–30 volts range.

9. The data logger according to claim 1, wherein the power management circuitry provides the voltage selection signals to any connected discrete sensor.

10. The data logger according to claim 1, further including a current to voltage converter for converting a current sensor signal to a voltage based sensor signal.

11. The data logger according to claim 1, wherein the discrete data comprises pulsed data.

12. The method according to claim 2, wherein the collected data is derived from one of analog data and discrete data.

13. The method according to claim 12 wherein the step of sending the collected data to the microcontroller includes the step of converting analog data into digital data.

14. The method according to claim 2, further including the step of transmitting the collected data at a predetermined radio frequency to an external device using a radio frequency transmitter coupled to the microcontroller.

15. The method according to claim 14, wherein the radio frequency transmitter is adapted to transmit radio frequency signals in the 900–928 MHz range.

16. A data logger according to claim 1 further including a function button disposed on the top cap, coupled to the microcontroller and capable of scrolling through a plurality of display functions when pushed.

17. A data logger according to claim 16 wherein only a single function button is disposed on an outer surface of the data logger.

18. A data logger according to claim 16 wherein the plurality of display functions include data logger serial number, time and date, and battery life remaining.

19. A data logger according to claim 16 wherein the function button is disposed on a top surface of the top cap adjacent to the display.

20. A data logger according to claim 19 further including a removable protective cover for mechanically covering the display.

21. A data logger according to claim 19 further including:
a removable protective radio frequency cover capable of being mechanically secured over at least a top surface of the top cap and having a radio frequency transmitter disposed on an outer surface thereof, such that
when the removable protective radio frequency cover is mechanically secured, the radio frequency transmitter becomes electrically coupled between the microcontroller and an antenna disposed on the protective radio frequency cover, and the protective radio frequency cover mechanically covers the display and
when the protective radio frequency cover is removed, the real-time data can be viewed on the display.

22. A data logger according to claim 21 further including a function button disposed on the top cap, coupled to the microcontroller and capable of scrolling through a plurality of display functions when pushed.

23. A data logger according to claim 22 wherein only a single function button is disposed on an outer surface of the data logger.

24. A data logger according to claim 22 wherein the plurality of display functions include data logger serial number, time, date, and battery life remaining.

25. A data logger according to claim 21 wherein the top cap has a larger diameter than the tube.

26. A data logger according to claim 21 wherein the diameter of the tube is about 2 inches.

27. A data logger according to claim 26 wherein the top cap has a larger diameter than the tube.

28. A data logger according to claim 1 wherein the top cap has a larger diameter than the tube.

29. A data logger according to claim 1 wherein the diameter of the tube is about 2 inches.

30. A data logger for collecting data using a connected sensor, comprising:
a substantially cylindrical tube and a top and a bottom, and including disposed within the tube:
a microcontroller coupled adapted to send commands relating to operation of the sensor and receive data collected from the connected sensor;
a data memory coupled to the microcontroller and adapted to store as real-time data the data collected from the sensor; and
a battery coupled to the microcontroller, the data memory, and the connected sensor;
a bottom cap mechanically connected to the bottom of the tube and allowing for the electrical coupling of the connected sensor to the microcontroller; and a top cap mechanically connected to the top of the tube and including on a top surface thereof a digital display coupled to the microcontroller and capable of displaying the real-time data.

31. A data logger according to claim 30 further including a function button disposed on the top cap, coupled to the microcontroller and capable of scrolling through a plurality of display functions when pushed.

32. A data logger according to claim 31 wherein only a single function button is disposed on an outer surface of the data logger.

33. A data logger according to claim 31 wherein the plurality of display functions include data logger serial number, time and date, and battery life remaining.

34. A data logger according to claim 31 wherein the single function button is disposed on the top surface of the top cap adjacent to the display.

35. A data logger according to claim 34 further including a removable protective cover for mechanically covering the display.

36. A data logger according to claim 34 further including:
a removable protective radio frequency cover capable of being mechanically secured over at least a top surface of the top cap and having a radio frequency transmitter disposed on an outer surface thereof, such that
when the removable protective radio frequency cover is mechanically secured, the radio frequency transmitter becomes electrically coupled between the microcontroller and an antenna disposed on the protective radio frequency cover, and the protective radio frequency cover mechanically covers the display and when the protective radio frequency cover is removed, the real-time data can be viewed on the display.

37. A data logger according to claim 36 further including a function button disposed on the top cap, coupled to the microcontroller and capable of scrolling through a plurality of display functions when pushed.

38. A data logger according to claim 37 wherein only a single function button is disposed on an outer surface of the data logger.

39. A data logger according to claim 37 wherein the plurality of display functions include data logger serial number, time, date, and battery life remaining.

40. A data logger according to claim 36 wherein the top cap has a larger diameter than the tube.

41. A data logger according to claim 36 wherein the diameter of the tube is about 2 inches.

42. A data logger according to claim 41 wherein the top cap has a larger diameter than the tube.

43. A data logger according to claim 30 wherein the top cap has a larger diameter than the tube.

44. A data logger according to claim 30 wherein the diameter of the tube is about 2 inches.

45. A method according to claim 2 further including the steps of:
removing the removable protective radio frequency cover; and
inserting a protective cap without any radio frequency transmitter disposed therein.

* * * * *